US012662002B2

(12) United States Patent
Ranjbar et al.

(10) Patent No.: US 12,662,002 B2
(45) Date of Patent: Jun. 23, 2026

(54) AUXILIARY POWER UNIT (APU) FOR ELECTRIC VEHICLES (EVS)

(71) Applicant: Canoo Technologies Inc., Torrance, CA (US)

(72) Inventors: Amir Ranjbar, Commerce Township, MI (US); Madhusudhan Kodanda Ramaiah, Irvine, CA (US); Yanjun Feng, Fullerton, CA (US)

(73) Assignee: WHS ENERGY SOLUTIONS, LLC, Argyle, TX (US)

( * ) Notice: Subject to any disclaimer, the term of this patent is extended or adjusted under 35 U.S.C. 154(b) by 160 days.

(21) Appl. No.: 18/478,254

(22) Filed: Sep. 29, 2023

(65) Prior Publication Data

US 2025/0108702 A1 Apr. 3, 2025

(51) Int. Cl.
B60L 1/00 (2006.01)
B60L 50/15 (2019.01)
B60L 53/80 (2019.01)

(52) U.S. Cl.
CPC .............. B60L 50/15 (2019.02); B60L 1/006 (2013.01); B60L 53/80 (2019.02)

(58) Field of Classification Search
CPC ..... Y02T 10/70; Y02T 10/7072; Y02T 90/14; Y02T 90/12; B60L 58/26; B60L 53/16; B60L 53/18; B60L 50/15; B60L 1/006; B60L 53/80; B60L 50/64; B60L 50/66; H01M 10/625; H01M 2220/20; Y02E 60/10
USPC ........... 429/120, 121, 99; 320/109; 701/122;

180/65.1, 65.29, 68.5; 307/9.1, 10.1; 318/139
See application file for complete search history.

(56) References Cited

U.S. PATENT DOCUMENTS

| | | | |
|---|---|---|---|
| 10,833,379 B2 | 11/2020 | Scaringe et al. | |
| 2016/0303990 A1* | 10/2016 | Penilla | B60L 53/80 |
| 2019/0016231 A1* | 1/2019 | Scaringe | H01M 10/613 |
| 2021/0384737 A1* | 12/2021 | Hansen | H01M 50/264 |
| 2022/0153148 A1* | 5/2022 | Vahedi | H02J 7/35 |
| 2022/0371443 A1* | 11/2022 | Stanfield | H01R 25/006 |
| 2023/0261331 A1 | 8/2023 | Morton et al. | |
| 2023/0264766 A1* | 8/2023 | Woods | B62D 33/02 |
| | | | 180/68.5 |

* cited by examiner

*Primary Examiner* — Elim Ortiz
(74) *Attorney, Agent, or Firm* — ALLEN, DYER, DOPPELT, + GILCHRIST, P.A. Attorneys at Law

(57) ABSTRACT

An auxiliary power unit for an electric vehicle fits within a well that is integrated with the structure of the electric vehicle. A housing for the auxiliary power unit fits within the well, with a lid on the housing covering an opening for the well, flush with adjoining surfaces. The auxiliary power unit includes a charge port and power outlet(s), and is configured for pass-through charging of the propulsion battery, or to recharge the propulsion battery. The auxiliary power unit is removable, and may be used separately from the electric vehicle or in another instance of the electric vehicle. Battery modules within the auxiliary power unit are also removable and have a power outlet for use separately from the auxiliary power unit. Safety interlocks for hot swapping and quick disconnects for electrical connectors and coolant hoses are provided on the auxiliary power unit and/or removable battery modules.

18 Claims, 8 Drawing Sheets

AUXILIARY POWER UNIT (APU) FOR ELECTRIC VEHICLES (EVS)

TECHNICAL FIELD

This disclosure relates generally to electric vehicles. More specifically, this disclosure relates to a power unit in addition to the main batteries within electric vehicles.

BACKGROUND

Electric vehicles (EVs) utilize batteries that typically consist of several smaller cells arranged together. Advanced energy storage system technologies have enabled greater range in EVs, but lack of sufficient charging system infrastructure remains the number one challenge for further attraction towards EVs. This issue becomes extremely critical in military applications, where there is no access to the charging system infrastructure in the combat field and recharging the combat EVs becomes a major challenge.

Current EVs are equipped with an on-board charger (OBC) module that is meant to provide charging power to the EVs when utilizing a Level-1 (L1) or Level-2 (L2) charging system to recharge the vehicle's propulsion battery pack. In most cases, the OBC is bidirectional, meaning that the OBC can both charge the vehicle using L1/L2 charging and provide power outlet (e.g., 110 volts (V)/240V) capability on board. However, the two functions of charging and providing power output capability cannot be satisfied at the same time. In other words, while the vehicle is being charged, there is no access to power via the power outlets such that external 110V/240V tools cannot be powered by the vehicle power system while vehicle is being charged. This causes inconvenience for consumer applications, and will be more critical for military applications.

Another challenge with current EVs is that the propulsion battery enclosure is sealed. Therefore, if the battery charge is exhausted, swapping the battery module(s) is not practical. Instead, significant time, effort, and skills are required, making it almost impossible to be done on a regular basis. When the battery charge runs out, the only practical option is to recharge the battery; if there is no access to a charging station, the vehicle cannot be used.

SUMMARY

This disclosure relates to an auxiliary power unit for an electric vehicle. The electric vehicle has a well for the auxiliary power unit that is integrated with the structure of the electric vehicle. A housing for the auxiliary power unit fits within the well, with a lid on the housing covering an opening for the well, flush with adjoining surfaces. The auxiliary power unit includes a charge port and power outlet(s), and is configured for pass-through charging of the propulsion battery, or to recharge the propulsion battery. The auxiliary power unit is removable, and may be used separately from the electric vehicle or in another instance of the electric vehicle. Battery modules within the auxiliary power unit are also removable and have a power outlet for use separately from the auxiliary power unit. Safety interlocks for hot swapping and quick disconnects for electrical connectors and coolant hoses are provided on the auxiliary power unit and/or removable battery modules.

In certain embodiments, an apparatus includes an auxiliary power unit separate from any main battery system within an electric vehicle. The auxiliary power unit is disconnected from a power distribution system of the electric vehicle during normal operation of the electric vehicle. The auxiliary power unit contained by a housing fitting within a well that is integrated into the structure of the electric vehicle and configured to hold one or more battery modules. The apparatus includes a charge port configured for connection to an external charger for charging of the one or more battery modules. The apparatus also includes at least one power outlet for connection to a device to be powered by the auxiliary power unit.

In certain embodiments, a method includes providing an auxiliary power unit separate from any main battery system within an electric vehicle. The auxiliary power unit is disconnected from a power distribution system of the electric vehicle during normal operation of the electric vehicle. The auxiliary power unit contained by a housing fitting within a well that is integrated into the structure of the electric vehicle and configured to hold one or more battery modules. The method includes configuring a charge port on the auxiliary power unit for connection to an external charger for charging of the one or more battery modules. The method further includes configuring at least one power outlet on the auxiliary power unit for connection to a device to be powered by the auxiliary power unit.

In some embodiments, the auxiliary power unit may be configured to supply power while the main battery system within the electric vehicle is being charged, or to supply exportable power to additional loads while also charging the main battery system within the electric vehicle.

In some embodiments, the housing may be one of a plurality of predetermined sizes, each of the predetermined sizes configured to hold a different number of the one or more battery modules for scaling energy and/or power of the auxiliary power unit.

In some embodiments, at least one of the one or more battery modules may be removable. The removable battery module may include: a handle for removing the at least one removable battery module from the housing; safety interlocks for hot swapping of the at least one removable battery module; and quick disconnects for electrical connectors and coolant hoses connecting the at least one removable battery module to the housing.

In some embodiments, the removable battery module may include: a charge port on the at least one removable battery module, the charge port on the at least one removable battery module configured for connection to an external charger for charging of the at least one removable battery module while outside the housing, or a power outlet on the at least one removable battery module as a power supply while outside the housing.

In some embodiments, the at least one power outlet may be configured to receive a connector for one of: power tools, the power distribution system of the electric vehicle, a charging cable for the main battery system within the electric vehicle, or a charging cable for another electric vehicle.

In some embodiments, the auxiliary power unit may be configured to power an electric motor within the electric vehicle when the at least one power outlet is connected to the connector for the power distribution system of the electric vehicle.

In some embodiments, the auxiliary power unit may be configured for pass-through charging when the external charger is connected to the charge port and the at least one power outlet is connected to the main battery system within the electric vehicle.

In some embodiments, the auxiliary power unit may be configured for fast charging by an alternating current power source.

In some embodiments, the well may be formed within a bed for the electric vehicle, with the housing including a removable lid covering an upper opening of the well when the housing in within the well.

In some embodiments, the housing may be removable from the well, and may include quick disconnects for electrical connectors and coolant hoses.

In some embodiments, the charge port and the at least one power outlet may be accessible through a rear portion of the electric vehicle near an area configured to hold a license plate.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1A through 4, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

The present disclosure addresses the challenges described above, and other challenges for electric vehicles, by providing an auxiliary power unit (APU), the structure and operation of which is described in further detail below. At least the well for the auxiliary power unit is integrated into the structure of the electric vehicle, rather than locating the auxiliary power unit on a roof rack or in a towed trailer.

Figure 1A:
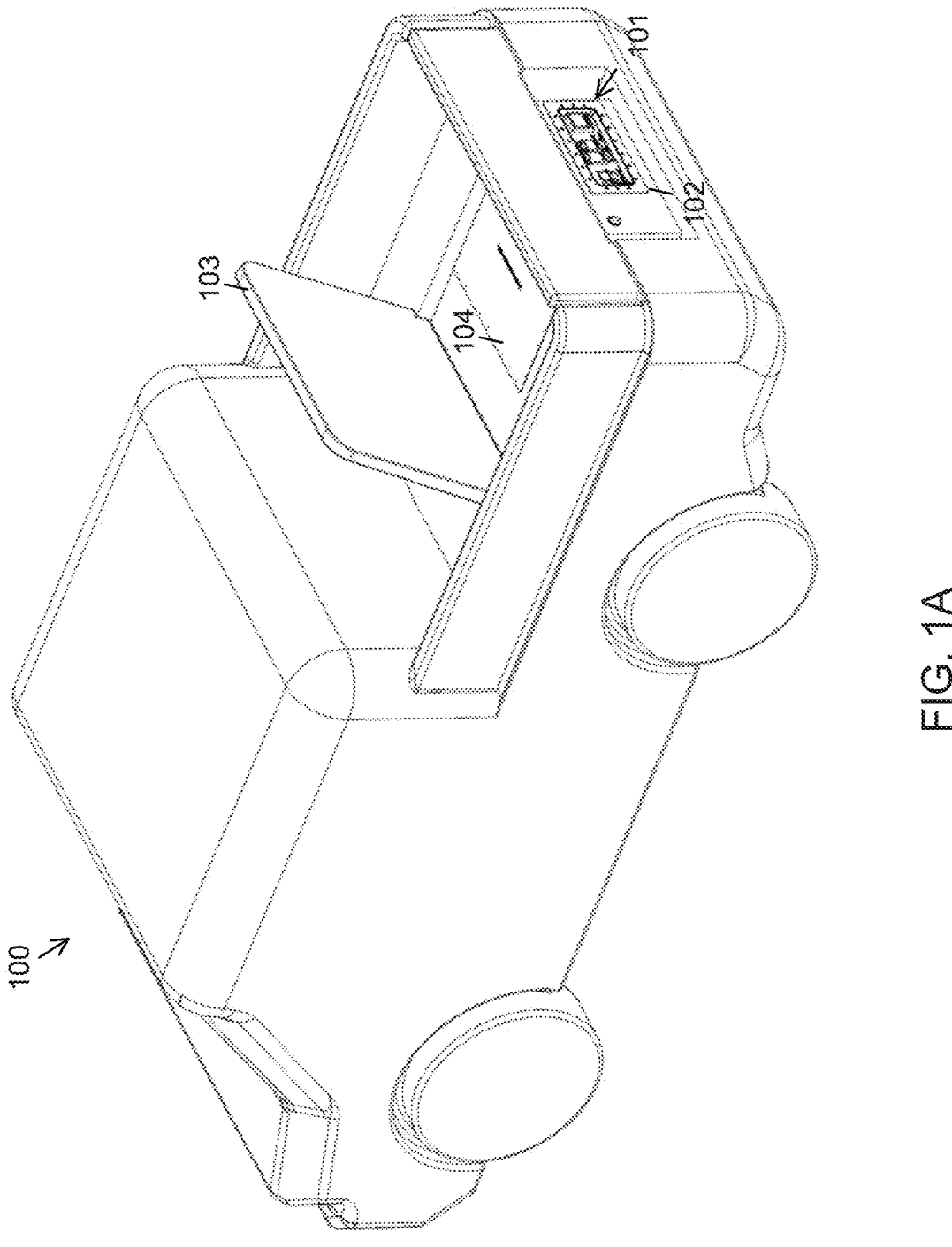
FIGS. 1A, 1B, 1C, and 1D illustrate incorporation of an auxiliary power unit within an electric vehicle in accordance with embodiments of the present disclosure.
Figure 1B:
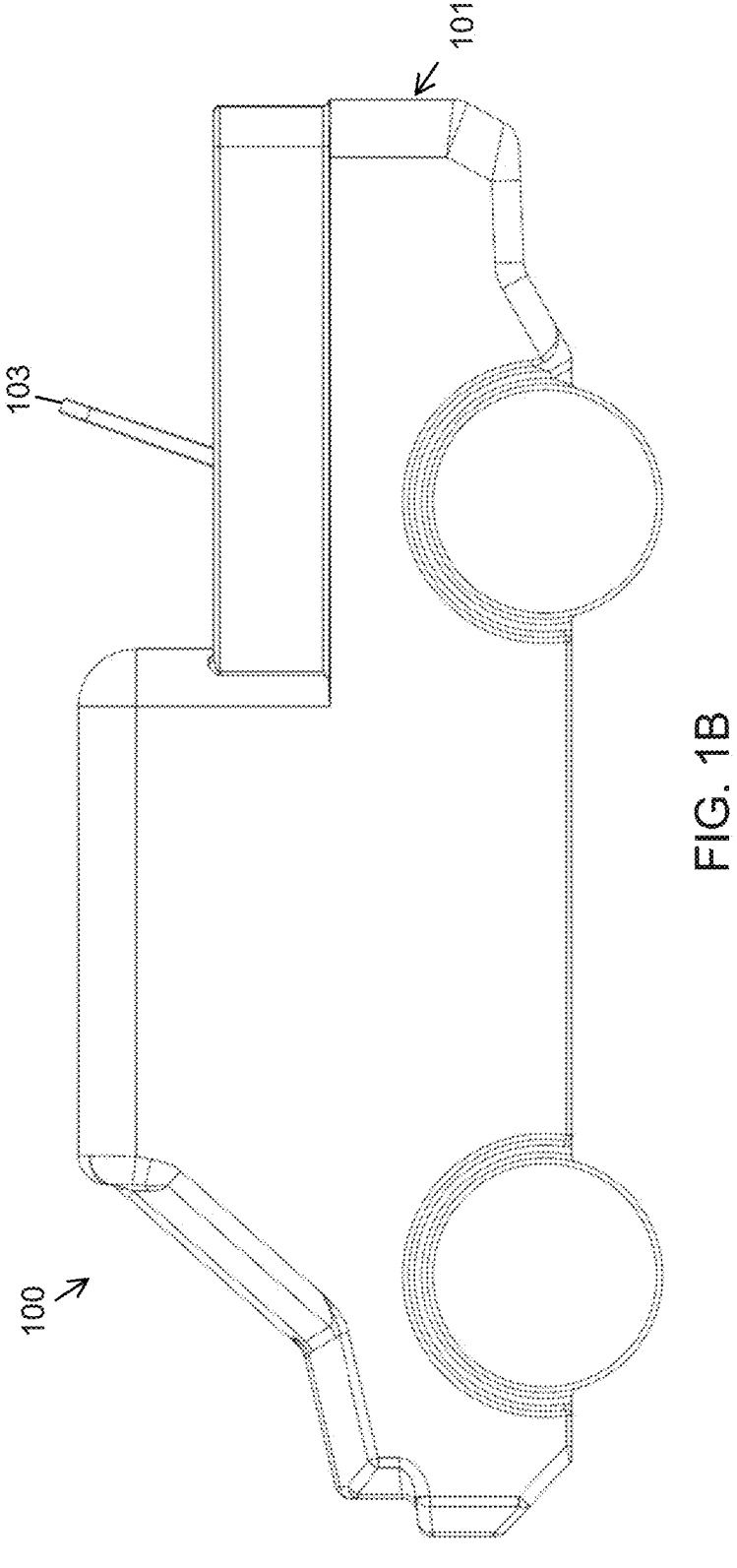
Figure 1C:
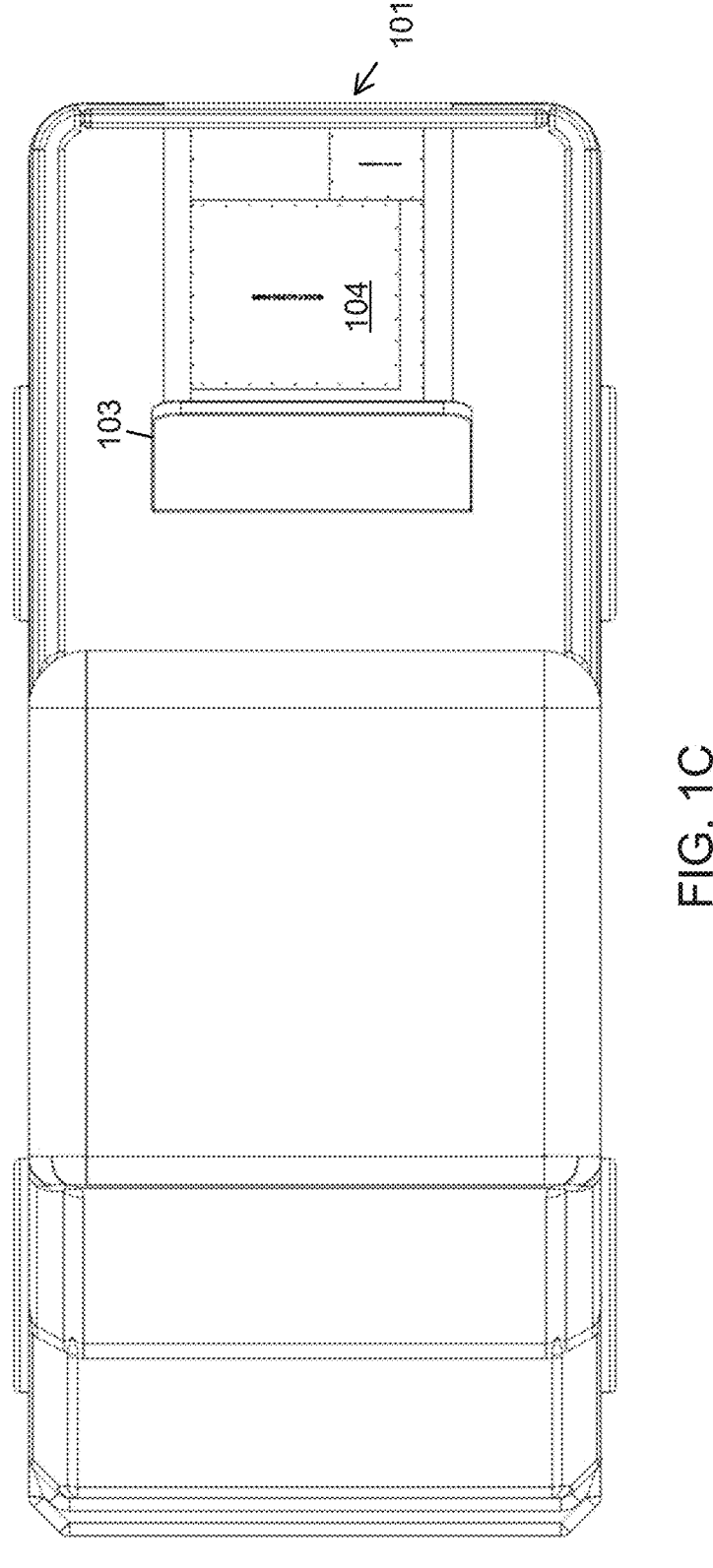
Figure 1D:
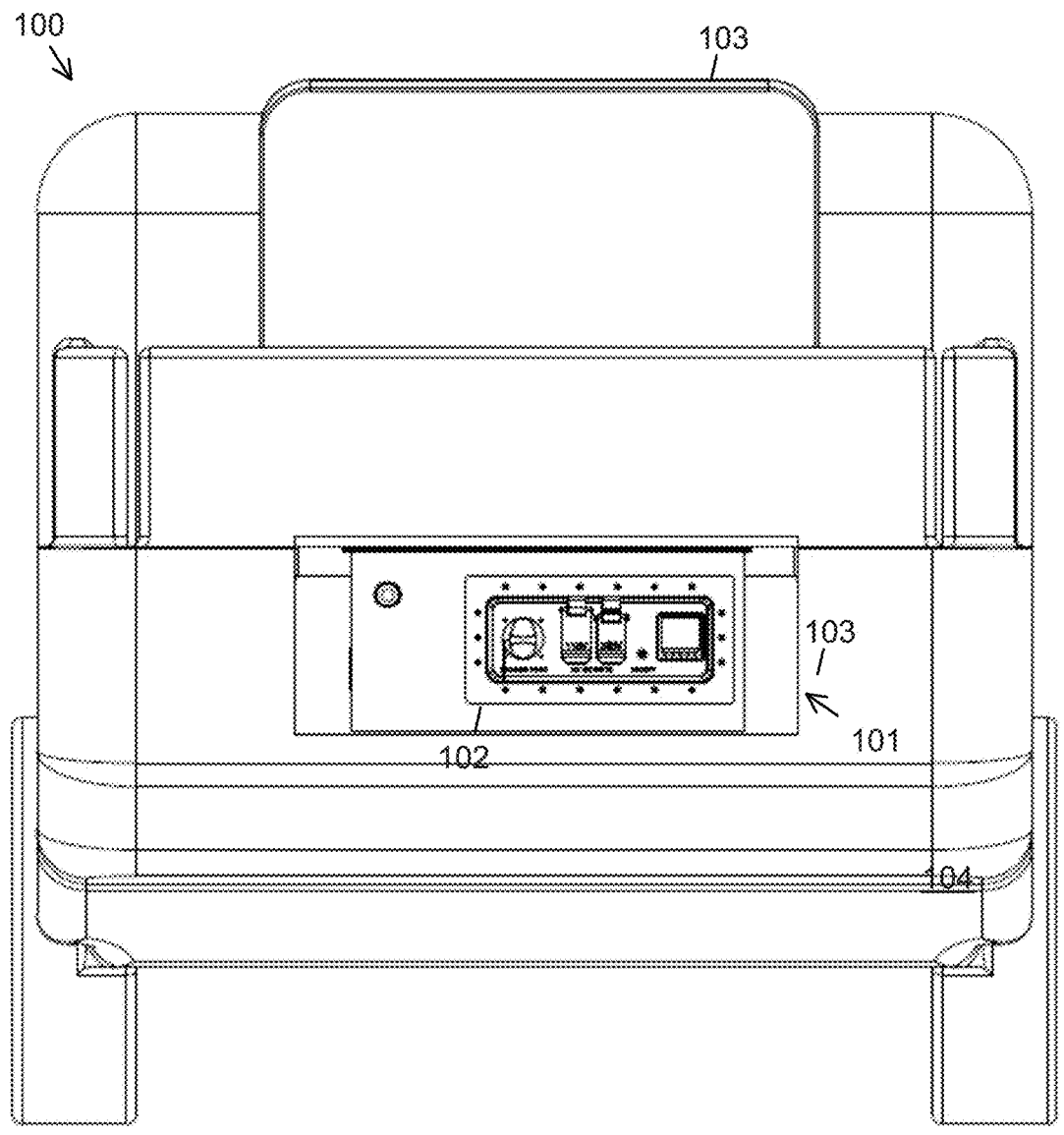

FIGS. 1A, 1B, 1C, and 1D illustrate incorporation of an auxiliary power unit within an electric vehicle in accordance with embodiments of the present disclosure. FIG. 1A is a perspective view of the electric vehicle 100, while FIG. 1B is a side elevation view, FIG. 1C is a plan view, and FIG. 1D is a rear elevation view. The embodiment illustrated in FIGS. 1A through 1D is for illustration and explanation only. FIGS. 1A through 1D do not limit the scope of this disclosure to any particular implementation.

An auxiliary power supply, indicated generally by 101, is positioned within a well that is integrated into the body of an electric vehicle 100. For clarity of illustration, electric vehicle 100 in FIGS. 1A through 1D is illustrated as having open cargo storage (i.e., a truck). However, in contrast with such open cargo storage, the auxiliary power unit 101 may be employed in conjunction with any vehicle with cargo storage to the rear of the passenger portion of the cabin (such as a van or a truck with the bed enclosed by a removable camper) or in the cargo storage (trunk, or front trunk/ "frunk") of a two- or four-door passenger vehicle (e.g., a sedan). Regardless, the electric vehicle 100 includes an auxiliary power unit, described in further detail below, that is preferably positioned in the area of the cargo storage (but which may be positioned elsewhere within the vehicle).

In the exemplary embodiment of FIGS. 1A through 1D, the well receiving the auxiliary power unit 101 is recessed into the bottom of the floor of the cargo storage area (e.g., the pickup bed), with an operator panel 102 exposed at a rear of electric vehicle 100. Of course, the well may be recessed into the floor of the electric vehicle 100 at any location within the cargo storage footprint, or even within the passenger portion of the cabin (e.g., under the driver's seat). The well may extend into or even through a skateboard platform for the electric vehicle 100. The well receiving the auxiliary power unit 101 includes a movable cover 103, shown as rotatable in the example of FIGS. 1A through 1D but alternatively slidable or completely removable. The auxiliary power unit 101 also includes a lid 104 with an inset handle, discussed in further detail below. While the well for the auxiliary power unit 101 is integrated onto the electric vehicle 100, as depicted in FIGS. 1A through 1D, the auxiliary power unit 101 as a whole and/or the battery modules therein (see the description below) can also work as a stand-alone unit.

The auxiliary power unit 101 outputs a high voltage (HV) output, comparable to the output of the propulsion battery within the electric vehicle 100. During normal operation of the electric vehicle 100, the auxiliary power unit 101 is disconnected from the power distribution system of the electric vehicle 100. Specifically, the auxiliary power unit 101 is disconnected from the propulsion battery and electric motor. As necessary, the auxiliary power unit 101 may be selectively connected to the propulsion battery and electric motor and used to power the electric vehicle 100 (instead of the propulsion battery) or to recharge the propulsion battery.

The auxiliary power unit 101 includes safety interlocks for hot swapping of the auxiliary power unit 101 with another instance of an auxiliary power unit of the same design. The auxiliary power unit 101 also includes quick disconnects for electrical connectors and—particularly— coolant hoses connecting the auxiliary power unit 101 to the power distribution system and the coolant system, respectively, of the electric vehicle 100.

Figure 2A:
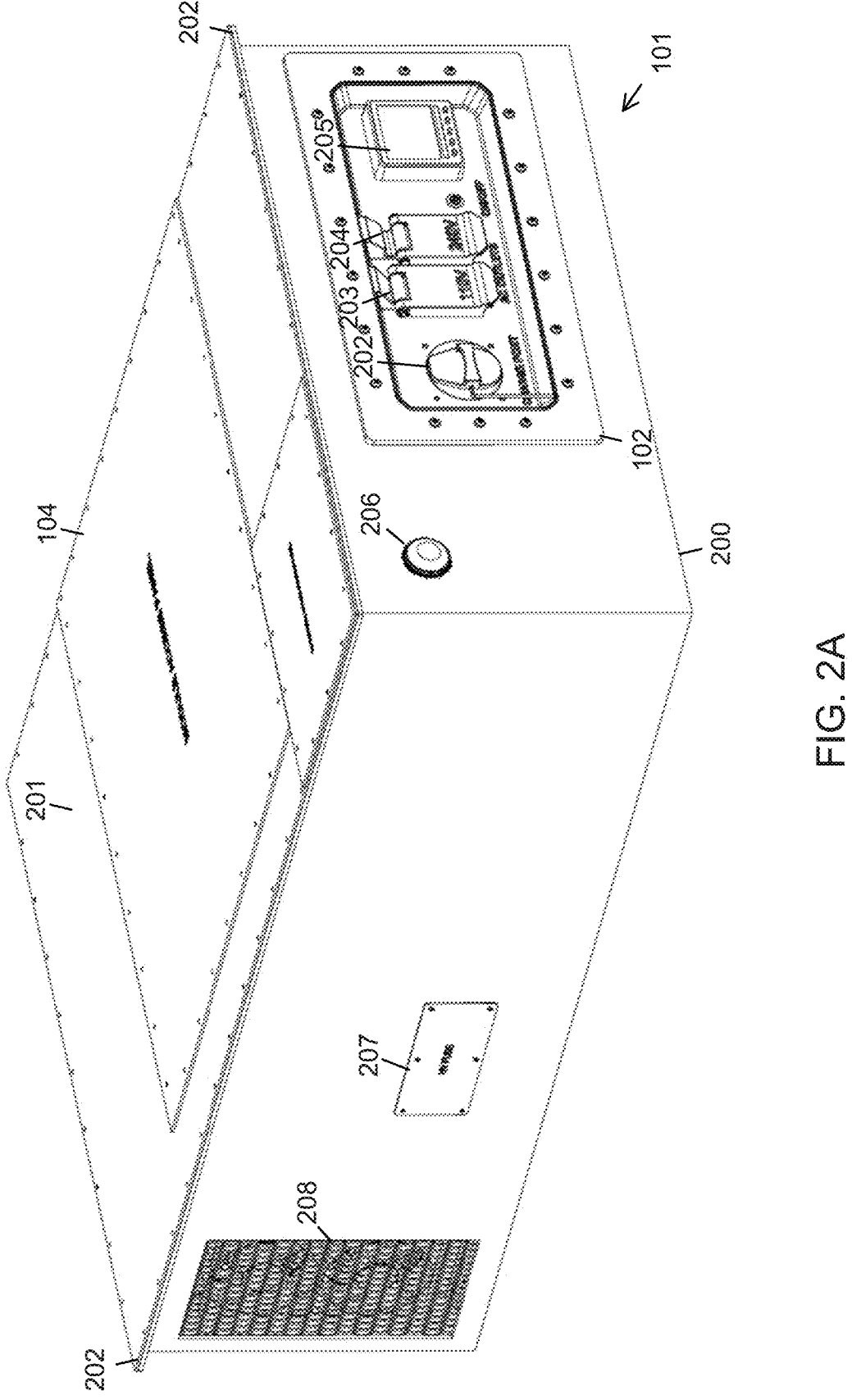
FIGS. 2A through 2C are various views of an auxiliary power unit for use within an electric vehicle in accordance with embodiments of the present disclosure.
Figure 2B:
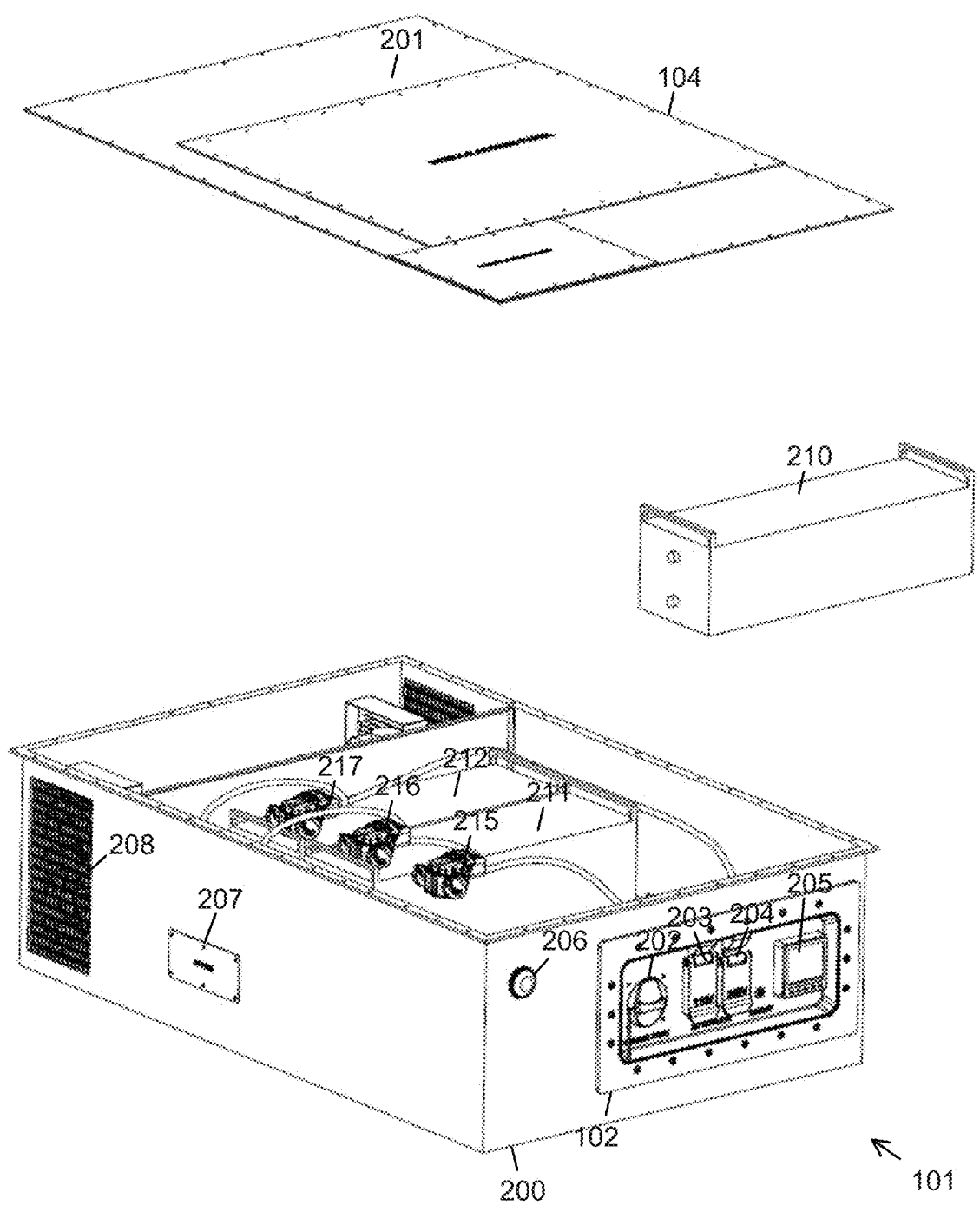
Figure 2C:
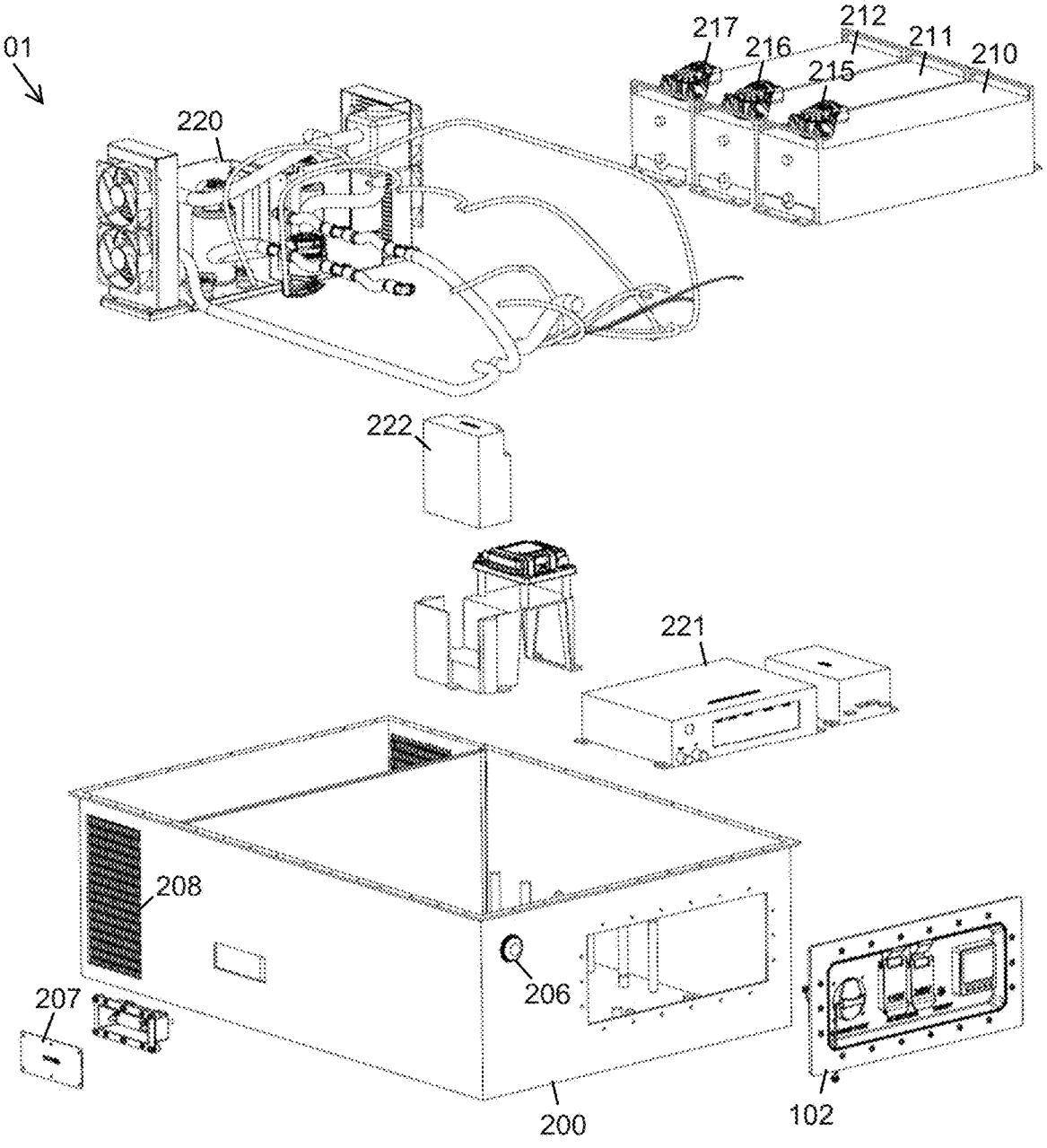

FIGS. 2A through 2C are various views of an auxiliary power unit for use within an electric vehicle in accordance with embodiments of the present disclosure. FIG. 2A is a perspective view of the fully assembled auxiliary power unit, and FIG. 2B is the same view with the cover for the housing of the auxiliary power unit removed. FIG. 2C is an exploded perspective view of components (excluding the housing cover) of the auxiliary power unit. The embodiment illustrated in FIGS. 2A through 2C is for illustration and explanation only. FIGS. 2A through 2C do not limit the scope of this disclosure to any particular implementation.

The auxiliary power unit 101 is enclosed within a housing 200. The housing 200 has a cover 201 that includes the movable or removable lid 104, and is itself removable (although lid 104 may merely be secured by latches while removal of screws may be necessary to remove cover 201). In the example shown in FIGS. 2A through 2C, the cover 201 on the housing 200 has a protruding lip 202 around a periphery thereof. The opening at the top of the well within the electric vehicle 100 (that accommodates the housing 200) may have a recessed ledge around a periphery thereof, receiving the protruding lip 202 and having length and width dimensions matching the perimeter of the cover 201 and a depth matching the height of the protruding lip 202.

The housing 200 (including cover 201) for the auxiliary power unit 101 is preferably removable from the well within the electric vehicle 100, such that the auxiliary power unit 101 may be used separately from the electric vehicle 100, or may be moved to and used with a different instance of an electric vehicle of the same or similar design.

The cover 201 is preferably sized to match the open area of the well receiving the auxiliary power unit 101, such that the cover 201 fills an upper opening of the well when the housing 200 is within the well. The height of the housing 200 and the depth of the well may be sized so that the top of the cover 201 fits flush with the cargo storage floor surrounding the well. Alternatively, the depth of the well may be greater than the height of the housing 200, so that the auxiliary power unit 101 hangs suspended within the well. As noted above, the cover 201 may include an inset handle (not visible in FIGS. 2A through 2C) or other handle(s) allowing the auxiliary power unit 101 to be lifted out of the well.

The well within the electric vehicle 100 that accommodates the housing 200 may be one of a plurality of predetermined sizes, each of which is configured to hold a different number of battery modules, for scaling energy and/or power of the auxiliary power unit 101. In some embodiments, the dimensions of the well and the cover 201 may be fixed, but the size of the housing 200 may vary depending upon the number of battery modules contained therein. In other embodiments, the dimensions of the well, the cover 201, and the housing 200 may be fixed, with empty space left inside the housing when fewer battery modules are held therein.

The operator panel 102 on the auxiliary power unit 101 includes user interfaces, including a charge port 202, a 110V outlet 203, a 240V outlet 204, and a display screen 205, all of which are accessible at the rear end of the electric vehicle 100. The charge port 202 is configured for connection to an external charger for charging of the one or more battery modules within the auxiliary power unit 101. As with the propulsion battery, the auxiliary power unit 101 is configured for fast charging when connected by an external charger to an alternating current power source, such as the electric grid. The 110V and 240V outlets 203, 204 are configured to receive conventional plugs for (for example) power tools. The display screen 205 can display status information regarding the charge of battery modules within the auxiliary power unit 101, and the like.

Housing 200 includes vent 206 for added safety during emergency events, and an access port with a removable cover 207 for replacement of fuse(s) as necessary. Housing also includes a mesh-, grill-, or louver-covered opening 208 for air circulation by a fan within housing 200. The well within which the housing 200 is received may include cavities or grooves, or the outer surface of the housing 200 may include stand-off protrusions, to help with air circulation by that fan while the auxiliary power unit 101 is in the well. In addition, there may be one or more a mesh-, grill-, or louver-covered opening(s) on the well within the auxiliary power unit 101 sits in the electric vehicle 100, to help with the air circulation. At least one of those opening(s) on the well should be aligned with the opening 208 on the housing 200, to allow air circulation.

The auxiliary power unit 101 includes a plurality of removable battery modules 210, 211, 212 within but removable from the housing 200. While three battery modules are shown, ore or fewer may be provided for, or used. The individual battery modules 210, 211, 212 may produce the HV output when connected in series, but may produce a lower voltage output alone when removed from the housing 200. Each battery module 210, 211, and 212 includes handle(s) for removing the respective module from the housing 200. Each battery module 210, 211, and 212 also includes respective safety interlocks and quick disconnects 215, 216, and 217, for connection of electrical connectors and coolant hoses from the housing 200 to the respective battery module in a manner allowing hot swapping of the respective battery module. In addition to battery modules 210, 211, and 212, the internal components of the auxiliary power unit 101 include an integrated cooling system 220, a bidirectional on-board charger 221, protection components including fuses and contactors, and a small low voltage (LV, e.g., 12V) battery 222. Each battery module 210, 211, and 212 may include a charge port configured for connection to an external charger, for charging the respective battery module while outside the housing 200. Each battery module 210, 211, and 212 may also include a power outlet allowing the respective battery module to be used as a power supply while outside the housing 200. As with the outlets 203 and 204, the power outlet on battery module 210, 211, and 212 may be configured for connection to power tools, the power distribution system of the electric vehicle, a charging cable for the propulsion battery within the electric vehicle 100, and/or a charging cable for another electric vehicle.

When disconnected from the vehicle power distribution system (i.e., when not being used to power the electric vehicle 100 or to recharge the propulsion battery), the auxiliary power unit 101 is still operational while on board the electric vehicle 100, and may be used to power tools. When connected to the power distribution system of the electric vehicle 100, the auxiliary power unit 101 may directly power an electric motor within the electric vehicle.

One feature of the auxiliary power unit 101 is improved range of the electric vehicle 100, by using the auxiliary power unit 101 to charge the propulsion battery pack. As noted above, the auxiliary power unit 101 can be used as a stand-alone unit to supply external 110V/240V loads. Although removable, the auxiliary power unit 101 is properly integrated to the electric vehicle 100 and, in the example described in which the well extends into or through the propulsion battery modules, keeps the center of gravity low for the electric vehicle 100. Located at the rear of the electric vehicle 100 as shown in the exemplary embodiment, away from cabin passengers, the auxiliary power unit 101 provides a high degree of safety. The major components of the auxiliary power unit 101, including the LV battery 222, the HV battery modules 210, 211, and 212, and protection devices, are all serviceable while the auxiliary power unit 101 is on the electric vehicle 100. The charge-port 202, 110V/240V outlets 203 and 204, and the user interface display screen 205 are easily accessible from the rear of the electric vehicle 100. The battery modules 210, 211, and 212 are swappable. The advanced cooling system capability that makes the auxiliary power unit 101 operable while on the electric vehicle 100 at high ambient temperatures.

Functionally, the auxiliary power unit 101 provides 110V/240V outlet capability while the electric vehicle 100 is being charged. The auxiliary power unit 101 can also supply power while the main (propulsion) battery system within the electric vehicle 100 is being charged, or can supply exportable power to additional loads while also charging the main battery system within the electric vehicle 100. Further, the auxiliary power unit 101 allows for pass-through charging when an external charger is connected to the charge port 202 and one of power outlets 203, 204 is connected to the propulsion battery within the electric vehicle 100.

Figure 3:
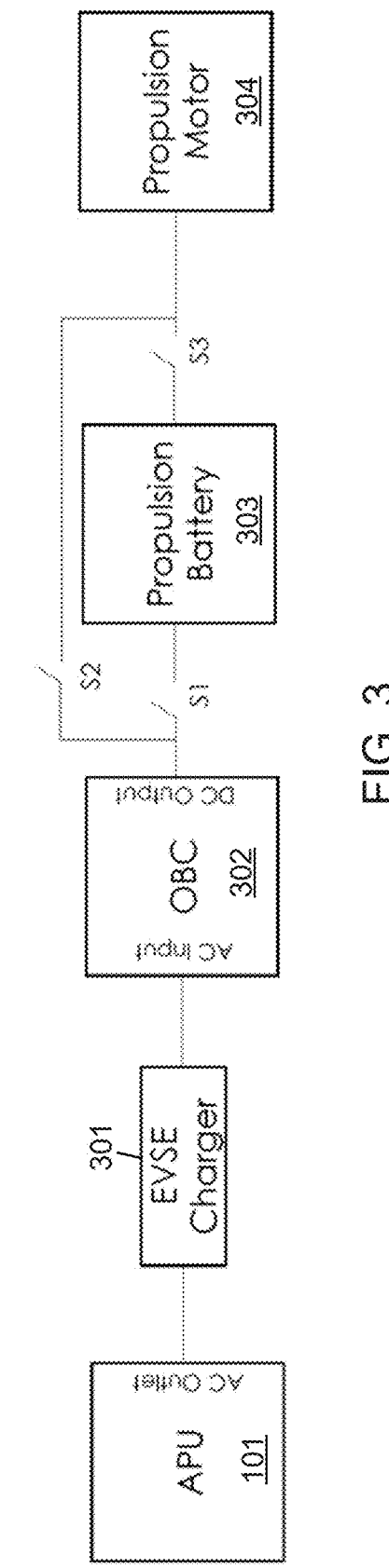
FIG. 3 is a high level block diagram of the electrical connections between the auxiliary power unit of the present disclosure and other electric components of the electric vehicle in accordance with embodiments of the present disclosure.

FIG. 3 is a high level block diagram of the electrical connections between the auxiliary power unit of the present disclosure and other electric components of the electric vehicle in accordance with embodiments of the present disclosure. The embodiment illustrated in FIG. 3 is for illustration and explanation only. FIG. 3 does not limit the scope of this disclosure to any particular implementation.

In the power system 300 of FIG. 3, the auxiliary power unit 101 is connected at an alternating current (AC) outlet to an electric vehicle supply equipment (EVSE) charger 301, which is connected to the AC input of an on-board charger (OBC) 302 for the electric vehicle 100. Switches S1, S2 and S3 selectively connect the vehicle OBC 302 to propulsion battery 303 for the electric vehicle 100, to the propulsion motor 304 for the electric vehicle 100, or both. The power system 300 has the following modes of operation:

when switch S1 is closed, switch S2 is open, and switch S3 is closed, the auxiliary power unit 101 charges the propulsion battery 303 while the propulsion battery 303 powers the propulsion motor 304;

when switch S1 is open, switch S2 is closed, and switch S3 is open, the auxiliary power unit 101 directly powers the propulsion motor 304 while the propulsion battery 303 is bypassed (not being charged); and when switch S1 is closed, switch S2 is closed, and switch S3 is open, the auxiliary power unit 101 both charges the propulsion battery 303 and powers the propulsion motor 304.

Depending on available energy storage within the auxiliary power unit 101, the auxiliary power unit 101 can still supply any external load while operating in the three modes described above. Communication between the auxiliary power unit 101 and the vehicle control module takes place through the vehicle OBC 302, as the vehicle OBC 302 is connected to control area network (CAN) bus of the electric vehicle 100. Communication between the auxiliary power unit 101 and the vehicle OBC 302 may occur through pilot line communication (PLC) circuitry in the OBC 302 and the EVSE charger 301. The EVSE charger 301 reads how much power is available on the auxiliary power unit 101 and communicates that information to the vehicle OBC 302, which the vehicle OBC 302 then broadcasts onto CAN bus for a vehicle control module to monitor.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus, comprising:

an auxiliary power unit separate from any main battery system within an electric vehicle, the auxiliary power unit switchable between disconnected from a propulsion battery and an electric motor of the electric vehicle during normal operation of the electric vehicle and connected to the propulsion battery and the electric motor so that the auxiliary power unit powers the electric vehicle instead of the main battery system, the auxiliary power unit contained by a housing fitting within a well that is integrated into the structure of the electric vehicle and configured to hold one or more removable battery modules, the one or more removable battery modules comprising a handle for removing the at least one removable battery module from the housing, safety interlocks for hot swapping of the at least one removable battery module, and quick disconnects for electrical connectors and coolant hoses connecting the at least one removable battery module to the housing;

a charge port configured for connection to an external charger for charging of the one or more removable battery modules; and at least one power outlet for connection to a device to be powered by the auxiliary power unit.

2. The apparatus according to claim 1, wherein the auxiliary power unit is configured to one of:

supply power while the main battery system within the electric vehicle is being charged, or supply exportable power to additional loads while also charging the main battery system within the electric vehicle.

3. The apparatus according to claim 2, wherein the housing is one of a plurality of predetermined sizes, each of the predetermined sizes configured to hold a different number of the one or more battery modules for scaling energy and/or power of the auxiliary power unit.

4. The apparatus according to claim 1, wherein the at least one removable battery module comprises one or more of:

a charge port on the at least one removable battery module, the charge port on the at least one removable battery module configured for connection to an external charger for charging of the at least one removable battery module while outside the housing; or a power outlet on the at least one removable battery module as a power supply while outside the housing.

5. The apparatus according to claim 1, wherein the at least one power outlet is configured to receive a connector for one of:

one or more power tools, the power distribution system of the electric vehicle, a charging cable for the main battery system within the electric vehicle, or a charging cable for another electric vehicle.

6. The apparatus according to claim 5, wherein the auxiliary power unit is configured to power an electric motor within the electric vehicle when the at least one power outlet is connected to the connector for the power distribution system of the electric vehicle.

7. The apparatus according to claim 1, wherein the auxiliary power unit is configured for pass-through charging when the external charger is connected to the charge port and the at least one power outlet is connected to the main battery system within the electric vehicle.

8. The apparatus according to claim 1, wherein the auxiliary power unit is configured for fast charging by an alternating current power source.

9. The apparatus according to claim 1, wherein the well is formed within a bed for the electric vehicle, wherein the housing comprises a removable lid covering an upper opening of the well when the housing in within the well.

10. The apparatus according to claim 1, wherein the housing is removable from the well, and wherein the housing comprises quick disconnects for electrical connectors and coolant hoses.

11. The apparatus according to claim 1, wherein the charge port and the at least one power outlet are accessible through a rear portion of the electric vehicle configured to hold a license plate.

12. A method, comprising:

providing an auxiliary power unit separate from any main battery system within an electric vehicle, the auxiliary power unit switchable between disconnected from a propulsion battery and an electric motor of the electric vehicle during normal operation of the electric vehicle and connected to the propulsion battery and the electric motor so that the auxiliary power unit powers the electric vehicle instead of the main battery system, the auxiliary power unit contained by a housing fitting within a well that is integrated into the structure of the electric vehicle and configured to hold one or more removable battery modules, the one or more removable battery modules comprising a handle for removing the at least one removable battery module from the housing, safety interlocks for hot swapping of the at least one removable battery module, and quick disconnects for electrical connectors and coolant hoses connecting the at least one removable battery module to the housing;

configuring a charge port on the auxiliary power unit for connection to an external charger for charging of the one or more removable battery modules; and configuring at least one power outlet on the auxiliary power unit for connection to a device to be powered by the auxiliary power unit.

13. The method according to claim 12, wherein the auxiliary power unit is configured to one of:

supply power while the main battery system within the electric vehicle is being charged, or supply exportable power to additional loads while also charging the main battery system within the electric vehicle.

14. The method according to claim 13, wherein the housing is one of a plurality of predetermined sizes, each of the predetermined sizes configured to hold a different number of the one or more battery modules for scaling energy and/or power of the auxiliary power unit.

15. The method according to claim 12, wherein the at least one removable battery module comprises one or more of:

a charge port on the at least one removable battery module, the charge port on the at least one removable battery module configured for connection to an external charger for charging of the at least one removable battery module while outside the housing; or a power outlet on the at least one removable battery module as a power supply while outside the housing.

16. The method according to claim 12, wherein the at least one power outlet is configured to receive a connector for one of:

one or more power tools, the power distribution system of the electric vehicle, a charging cable for the main battery system within the electric vehicle, or a charging cable for another electric vehicle.

17. The method according to claim 16, wherein the auxiliary power unit is configured to power an electric motor within the electric vehicle when the at least one power outlet is connected to the connector for the power distribution system of the electric vehicle.

18. The method according to claim 12, wherein the auxiliary power unit is configured for pass-through charging when the external charger is connected to the charge port and the at least one power outlet is connected to the main battery system within the electric vehicle.

* * * * *